(12) United States Patent
Seo

(10) Patent No.: US 7,409,164 B2
(45) Date of Patent: Aug. 5, 2008

(54) OPTICAL TRANSCEIVER FOR COMPENSATING FOR LOSS DUE TO TRANSMISSION DISTANCE IN PASSIVE OPTICAL NETWORK

(75) Inventor: Ja-Won Seo, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 724 days.

(21) Appl. No.: 10/942,224

(22) Filed: Sep. 16, 2004

(65) Prior Publication Data

US 2005/0244160 A1 Nov. 3, 2005

(30) Foreign Application Priority Data

Apr. 30, 2004 (KR) .................. 10-2004-0030416

(51) Int. Cl.
H04B 10/00 (2006.01)
(52) U.S. Cl. .......................... 398/162; 398/63; 398/137
(58) Field of Classification Search ............... 398/63, 398/70–72, 130, 138, 139, 137, 162
See application file for complete search history.

(56) References Cited

U.S. PATENT DOCUMENTS 6,512,610 B1 * 1/2003 Minami et al. ............... 398/21

2001/0033406 A1 * 10/2001 Koike et al. ................. 359/152
2002/0041728 A1 * 4/2002 Yamashita et al. ........... 385/24
2006/0083245 A1 * 4/2006 Tanaka et al. ............. 370/395.2

FOREIGN PATENT DOCUMENTS

| JP | 08-079185 | 3/1996 |
| JP | 09-064904 | 3/1997 |
| JP | 10-163960 | 6/1998 |
| JP | 63-279626 | 11/1998 |
| JP | 2001-168843 | 6/2001 |
| WO | WO 98/13959 | 4/1998 |

* cited by examiner

Primary Examiner—Dzung D Tran
(74) Attorney, Agent, or Firm—Cha & Reiter, LLC (57) ABSTRACT

A passive optical network includes an optical line termination for generating multiple downward optical signals and multiple optical network units for receiving the downward optical signals. Each optical network unit includes a receiver for converting a corresponding downward optical signal inputted from the optical line termination into a first voltage signal and outputting the first voltage signal. Additionally, each optical network unit includes a transmitter for calculating a distance to the optical line termination from an intensity of the first voltage signal outputted from the receiver and generating an upward optical signal having an intensity adjusted according to the calculated distance to the optical line termination.

8 Claims, 6 Drawing Sheets

OPTICAL TRANSCEIVER FOR COMPENSATING FOR LOSS DUE TO TRANSMISSION DISTANCE IN PASSIVE OPTICAL NETWORK

CLAIM OF PRIORITY

This application claims priority to an application entitled "Optical transceiver for compensating for loss due to transmission distance and passive optical network using the same," filed in the Korean Intellectual Property Office on Apr. 30, 2004 and assigned Serial No. 2004-30416, the contents of which are hereby incorporated by reference.

BACKGROUND OF THE INVENTION

1. Field of the Invention

The present invention relates to a passive optical network, and more particularly to a passive optical network capable of controlling change of intensity of an optical signal due to transmission distance.

2. Description of the Related Art

Generally, a passive optical network (PON) includes an optical line termination (OLT) for providing a service, a plurality of optical network units (ONUs) using the service from the optical line termination, and remote nodes for connecting the optical line termination to the optical network units. In the passive optical network, the optical line termination is connected to the remote node through one optical fiber and the remote node is linked to the optical network units through additional optical fibers. The optical line termination generates downward optical signals to transmit to each optical network unit, and each optical network unit generates an upward optical signal to be outputted to the optical line termination.

In the aforementioned passive optical network, since distances between the optical line termination and each optical network unit are different from each other, the upward optical signals transmitted from each optical network unit to the optical line termination have intensities different from each other due to dispersion of the optical signals. Accordingly, the optical line termination must further include a burst-mode optical receiver for changing a discrimination critical value according to the intensity of each upward optical signal inputted from each optical network unit.

Figure 1:
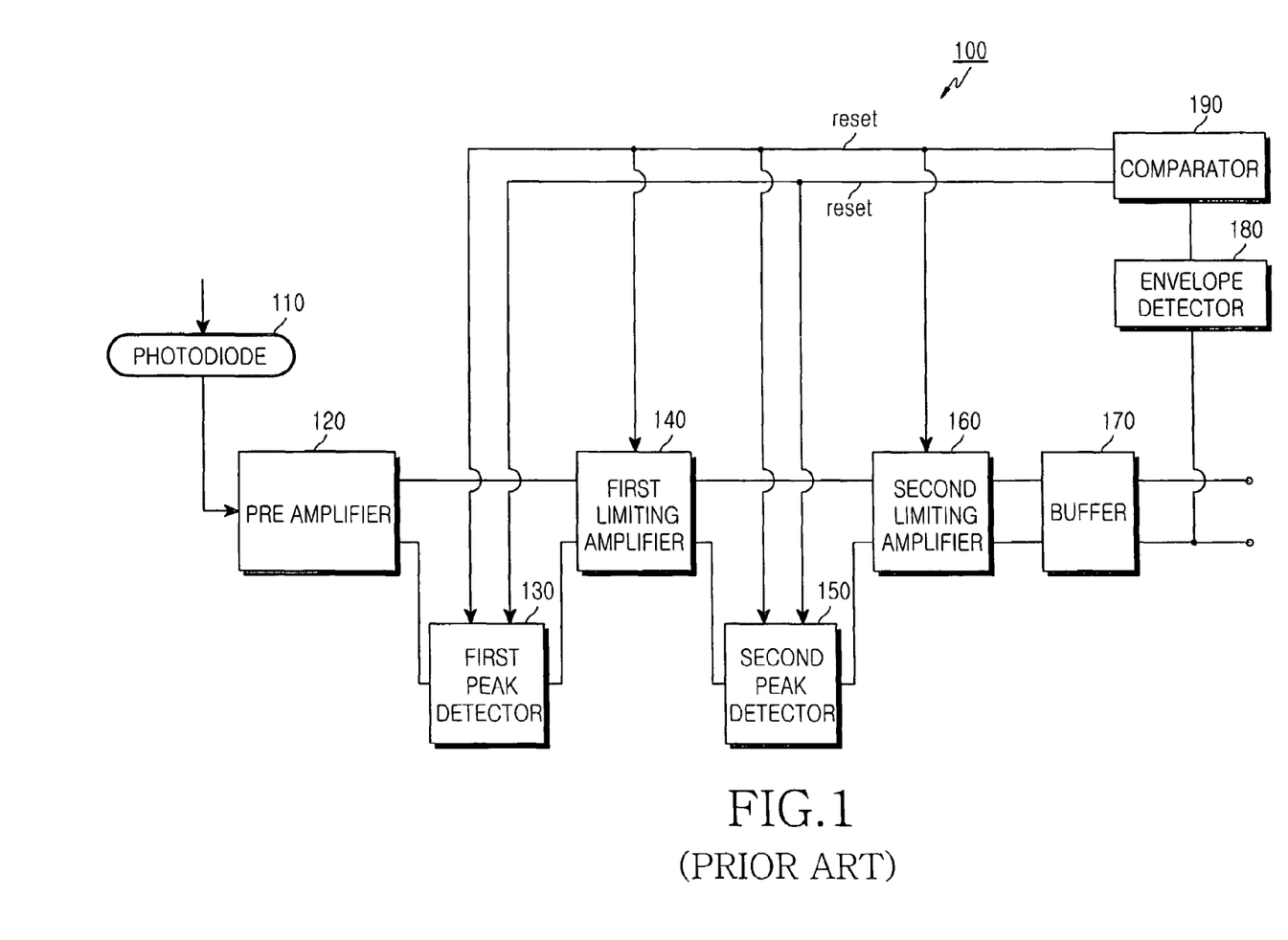
FIG. 1 is a block diagram showing a structure of a burst-mode receiver which can be applied to an optical line termination in a conventional passive optical network.

FIG. 1 is a block diagram showing a structure of a burst-mode receiver which can be applied to an optical line termination in a conventional passive optical network. The burst-mode receiver 100 includes a photodiode 110, a preamplifier 120, a first peak detector 130, a first limiting amplifier 140, a second peak detector 150, a second limiting amplifier 160, an envelope detector 180, a comparator 190, and a buffer 170.

The photodiode 110 converts an upward optical signal received from each optical network unit into electric current, and the preamplifier 120 converts the electric current received from the photodiode 110 into voltage and outputs the voltage.

The first peak detector 130 detects a top-peak value and a bottom-peak value of the voltage converted by the preamplifier 120 and calculates an intermediate value between the top-peak value and the bottom-peak value. The first limiting amplifier 140 differentially amplifies the voltage outputted from the preamplifier 120 and the intermediate value of the voltage calculated by the first peak detector 130.

The second peak detector 150 detects a top-peak value and a bottom-peak value of voltage provided from the first limiting amplifier 140, calculates an intermediate value of the two values, and provides the calculated intermediate value to the second limiting amplifier 160. The second limiting amplifier 160 differentially amplifies the intermediate value of the voltage detected by the second peak detector 150 and the voltage which has been differentially amplified by the first limiting amplifier 140 and provides the amplified voltage to the buffer 170.

The buffer 170 buffers the voltage differentially amplified by the second limiting amplifier 160 and outputs the buffered voltage and the envelope detector 180 detects an existence or absence of a packet signal with respect to the voltage outputted from the buffer 170. Further, the comparator 190 compares an output voltage of the envelope detector 180 with a reference voltage set in advance and generates an inverse reset signal having a polarity inverse to that of a reset signal.

An optical line termination having a burst-mode receiver must further include an additional circuit such as an automatic gain controller in order to satisfy reception sensitivity. In order to determine a discrimination critical value, increased elements must be considered in designing a passive optical network, for example, a charging condenser, etc., in a peak detector must be discharged by generating a reset signal in each optical network unit.

SUMMARY OF THE INVENTION

The present invention has been made to solve the above-mentioned problems occurring in the prior art, and an object of the present invention is to provide a transceiver of an optical network unit-side, which can prevent upward optical signals having different intensities, due to difference of distances between an optical line termination and optical network units, from being inputted to the optical line termination, even without a burst-mode receiver in the optical line termination.

In order to accomplish the aforementioned object, according to one aspect of the present invention, a passive optical network is provided comprising an optical line termination for generating multiple downward optical signals, multiple optical network units for receiving the downward optical signals, wherein each optical network unit comprises a receiver for converting a corresponding downward optical signal inputted from the optical line termination into a first voltage signal and outputting the first voltage signal and a transmitter for calculating a distance to the optical line termination from an intensity of the first voltage signal outputted from the receiver and generating an upward optical signal having an intensity adjusted according to the calculated distance to the optical line termination.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, an embodiment according to the present invention will be described with reference to the accompanying drawings. For the purposes of clarity and simplicity, a detailed description of known functions and configuration incorporated herein will be omitted as it may make the subject matter of the present invention unclear.

Figure 2:
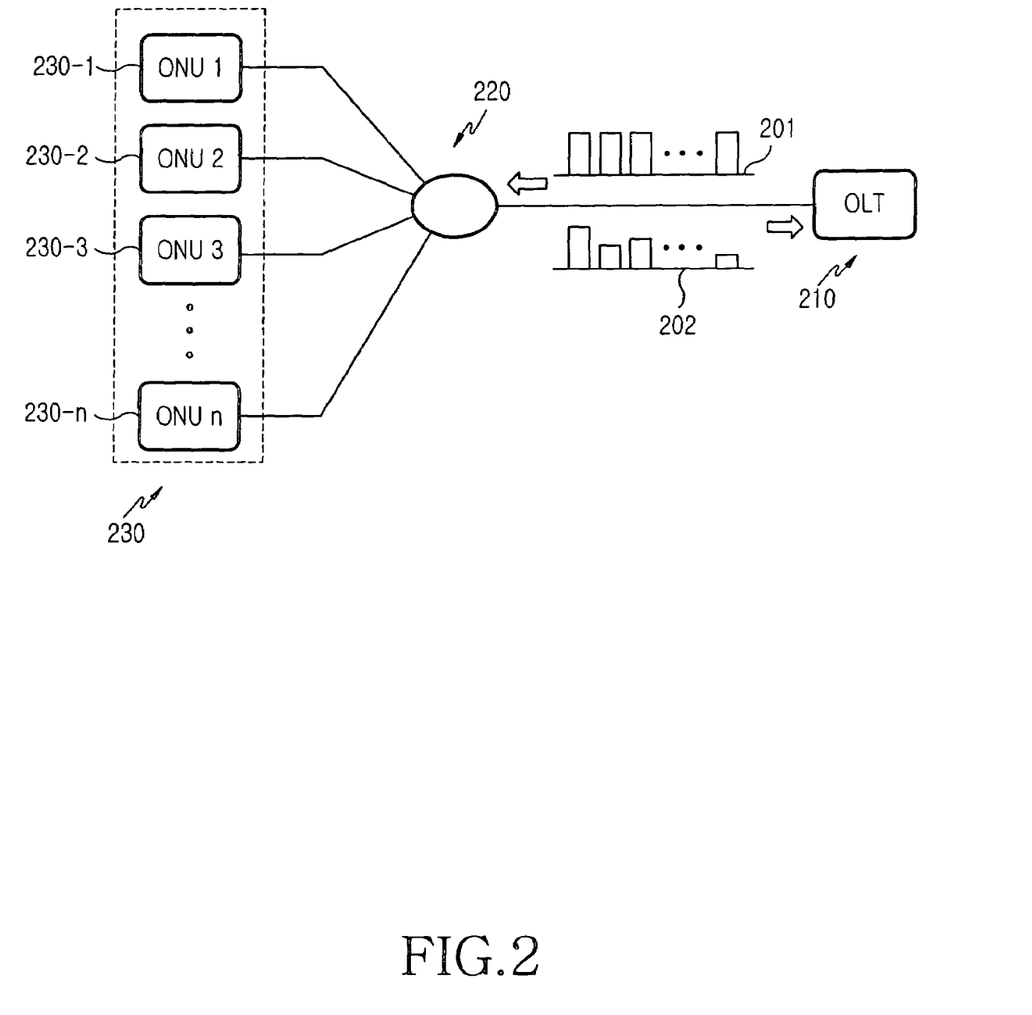
FIG. 2 is a schematic block diagram of a passive optical network according to a first embodiment of the present invention.

FIG. 2 is a schematic block diagram of a passive optical network. Referring to FIG. 2, the passive optical network according to the present invention includes an optical line termination 210, an optical network unit-side 230 having a plurality of optical network units 230-1 to 230-n, and an optical distribution network 220 for connecting the optical network unit-side 230 to the optical line termination 210.

The optical line termination 210 includes a light source, a photodetector, a multiplexer/demultiplexer. The light source generates downward optical signals to be transmitted to the optical network unit-side 230 and the photodetector detects upward optical signals inputted from the optical network unit-side 230. Further, the multiplexer/demultiplexer multiplexes the downward optical signals to output to the optical distribution network 220, and demultiplexes a multiplexed upward optical signal, which is received from the optical distribution network 220, to output to a corresponding photodetector.

The optical distribution network 220 is disposed between the optical line termination 210 and the optical network unit-side 230 and connects the optical line termination 210 to the optical network unit-side 230. That is, the optical distribution network 220 includes a multiplexer/demultiplexer such as an optical splitter or an arrayed waveguide grating, demultiplexes the multiplexed downward optical signal inputted from the optical line termination 210, outputs the demultiplexed optical signals to a corresponding optical network units 230-1 or 230-n of the optical network unit-side 230, multiplexes the upward optical signals inputted from each of the optical network units 230-1 to 230-n, and outputs the multiplexed optical signal to the optical line termination 210.

Figure 3:
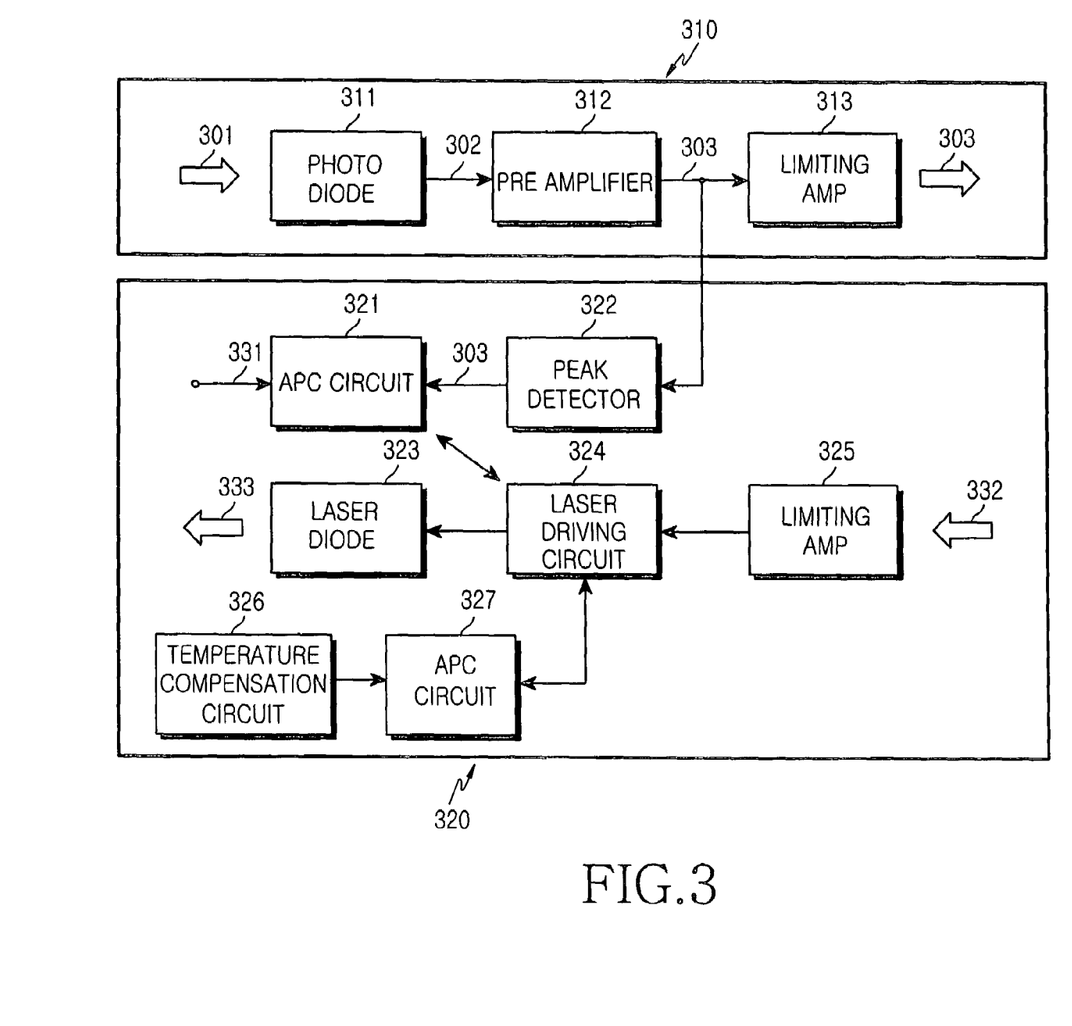
FIG. 3 is a block diagram showing a structure of a transceiver of an optical network unit-side according to a second embodiment of the present invention.

FIG. 3 is a block diagram showing a structure of a transceiver according to a second embodiment of the present invention. That is, FIG. 3 shows a structure of a transceiver which can be applied to each optical network unit shown in FIG. 2. Referring to FIGS. 2 and 3, each of the optical network units 230-1 to 230-n of the optical network unit-side 230 includes a transceiver having a receiver 310 and a transmitter 320. The receiver 310 converts a corresponding downward optical signal 301 into a first voltage signal 303 and outputs the first voltage signal 303. The transmitter 320 calculates a distance to the optical line termination 210 from the first voltage signal 303 outputted from the receiver 310, and generates an upward optical signal 333 having an intensity adjusted according to the calculated distance to the optical line termination 210. That is, each transceiver calculates the distance to the optical line termination 210 from the intensity of the corresponding downward optical signal 301 inputted from the optical line termination 210, and adjusts the intensity of a generated upward optical signal 333 according to the calculated distance.

The receiver 310 includes a photodiode 311 for converting the corresponding downward optical signal 301 into a first current signal 302, a preamplifier 312 for converting the first current signal 302 to a first voltage signal 303, and a first limiting amplifier 313 for amplifying the first voltage signal 303.

The transmitter 320 includes a second limiting amplifier 325, a laser diode 323, a peak detector 322, and a first APC circuit 321. The second limiting amplifier 325 amplifies a second voltage signal 332 and the laser diode 323 converts the second voltage signal 332 into the upward optical signal 333. The peak detector 322 calculates the intensity of the first voltage signal 303 inputted from the preamplifier 312, and the first APC circuit 321 controls the intensity of the upward optical signal 333, which is generated by the laser diode 323, according to the intensity of the first voltage signal 303 calculated by the peak detector 322. Also, the transmitter 320 may further include a temperature compensation circuit 326, a second APC circuit 327, or a variable optical attenuator, etc. The temperature compensation circuit 326 compensates for the temperature change of the laser diode 323 and the second APC circuit 327 controls the upward optical signal 333 generated by the laser diode 323 to have a constant intensity. Further, the variable optical attenuator adjusts the intensity of the upward optical signal generated by the laser diode 323.

Figure 4:
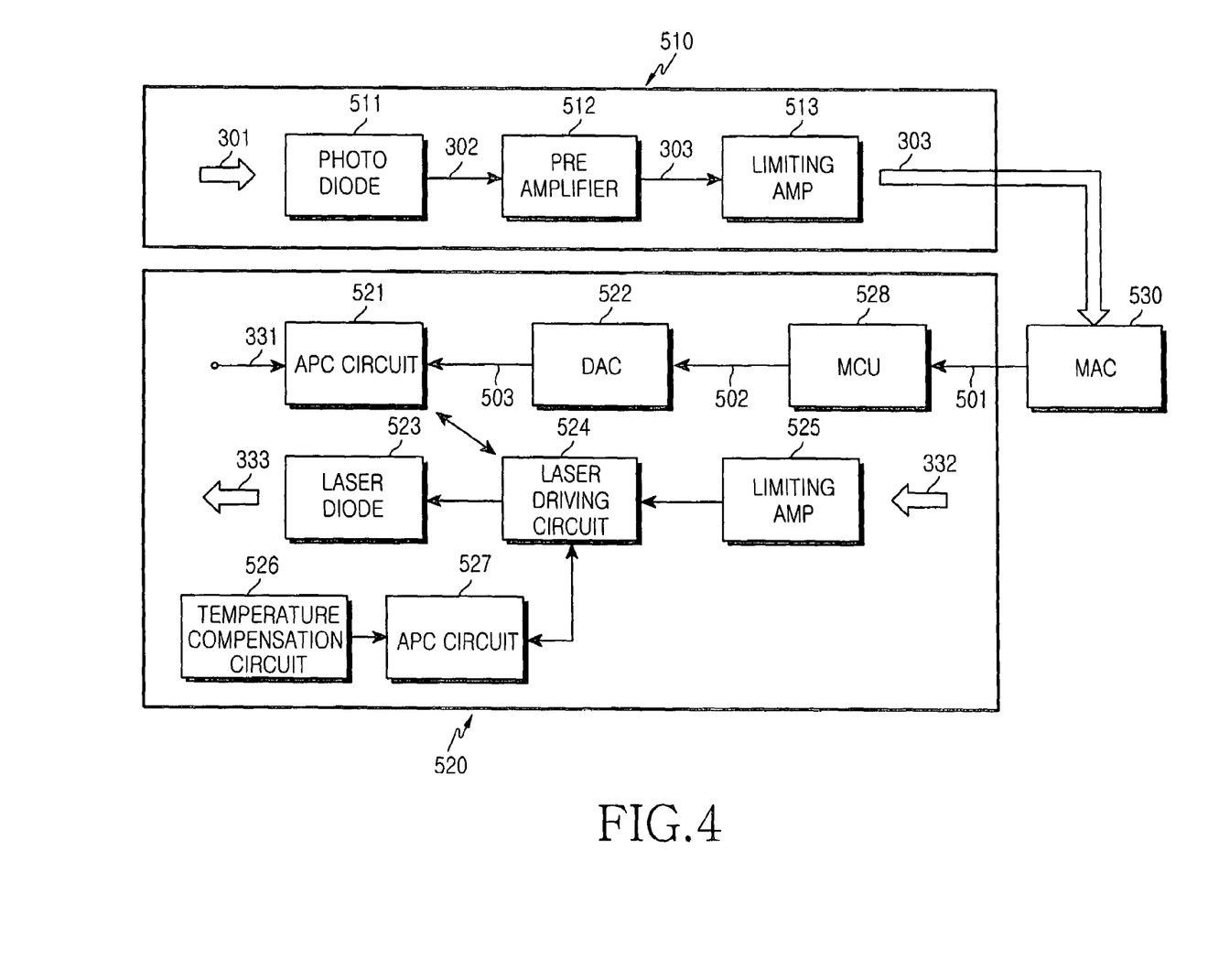
FIG. 4 is a block diagram showing a structure of a transceiver of an optical network unit-side according to a third embodiment of the present invention.

FIG. 4 is a block diagram showing a structure of a transceiver of an optical network unit-side according to a third embodiment of the present invention. That is, FIG. 4 shows a structure of a transceiver which can be applied to each optical network unit shown in FIG. 2. Referring to FIGS. 2 and 4, the transceiver according to the third embodiment of the present invention includes a receiver 510, a transmitter 520, and a media access control (MAC) 530. The receiver 510 converts the corresponding downward optical signal 301 into a first voltage signal 303 and outputs the first voltage signal 303. The transmitter 520 generates an upward optical signal 333 and controls the intensity of the generated upward optical signal 333 according to the intensity of the first voltage signal 303 outputted from the receiver 510.

The receiver 510 includes a photodiode 511 for converting the corresponding downward optical signal 301 into a first current signal 302 and outputting the first current signal 302, a preamplifier 512 for converting the first current signal 302 to a first voltage signal 303, and a first limiting amplifier 513 for amplifying the first voltage signal 303.

The transmitter 520 includes a second limiting amplifier 525, a laser diode 523, a first APC circuit 521, a laser driving circuit 524, a digital-to-analog converter (DAC) 522, a microcontroller unit (MCU) 528, a temperature compensation circuit 526, a second APC circuit 527.

The second limiting amplifier 525 amplifies a received second voltage signal 332 to output the amplified second voltage signal 332 to the laser driving circuit 524. The laser driving circuit 524 outputs the second voltage signal 332 to the laser diode 523, drives the laser diode 523 according to instructions of the first APC circuit 521, and adjusts the intensity of the upward optical signal 333 according to instructions of the first APC circuit 521.

The laser diode 523 converts the second voltage signal 332, which is inputted from the laser driving circuit 524, into the upward optical signal 333 to be outputted to the optical line termination.

The media access control 530 processes digital information transmitted from the transceiver to determine links between nodes. Since the media access control 530 plays a main role of transmitting not only data necessary for communication, but also information necessary for link connection between nodes through the transmitter 520 and the receiver 510, the media access control 530 can include information 501 on a distance between the optical line termination and the optical network unit in the data. That is, the media access control 530 includes the information 501 on the distance between the optical line termination and the optical network unit in the first voltage signal 303 inputted from the first limiting amplifier 513, and transmits the first voltage signal 303 containing the information 501 to the micro-controller unit 528. The micro-controller unit 528 generates a digital type control signal 502 for controlling the first APC circuit 521 from the information 501 and outputs the generated control signal 502 to the digital-to-analog converter 522. When the first APC circuit 521 is controlled by an analog signal, the digital-to-analog converter 522 converts the control signal 502 to an analog signal 503 and outputs the analog signal 503 to the first APC circuit 521. That is, the first APC circuit 521 controls the laser driving circuit 524 according to the control signal 502, thereby controlling the intensity of the upward optical signal 333.

The temperature compensation circuit 526 compensates for a change of the intensity of the upward optical signal 333 due to temperature change, and the second APC circuit 527 controls the laser driving circuit 524 according to instructions of the temperature compensation circuit 526.

Figure 5A:
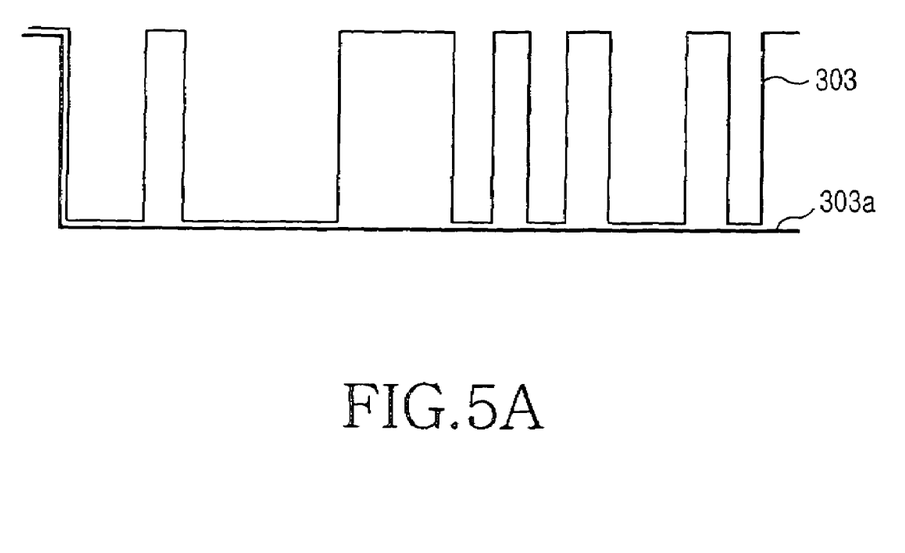
FIGS. 5a to 5d are views illustrating waveforms of signals inputted/outputted to/from the transceivers shown in FIGS. 3 and 4.
Figure 5B:
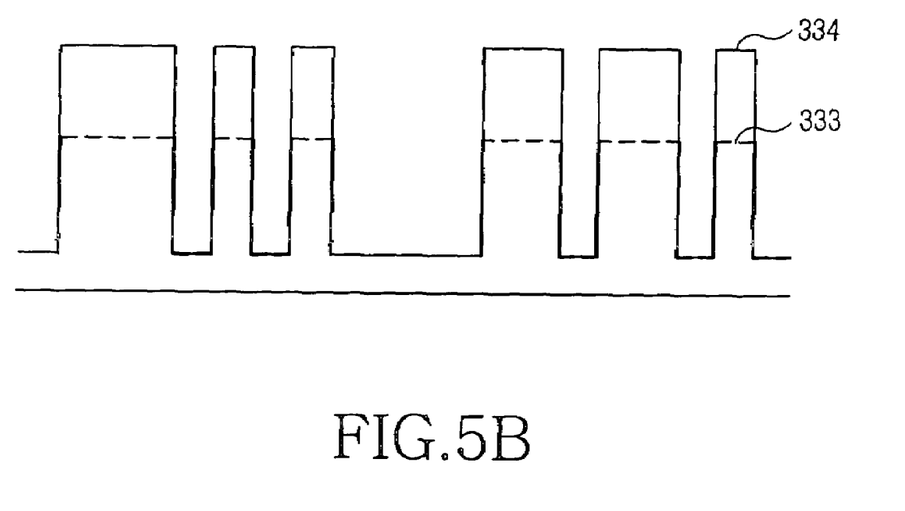

FIGS. 5a to 5d are views illustrating waveforms of signals inputted/outputted to/from the optical network units shown in FIGS. 3 and 4. Referring to FIGS. 5a to 5b, the peak detector 322 calculates a bottom-peak value 303a of the first voltage signal 303 inputted from the preamplifier 312. Since the calculated bottom-peak value 303a is proportional to the intensity of the corresponding downward optical signal 301 received from the optical line termination 210, a distance between the optical line termination 210 and a corresponding optical network unit 230-1 or 230-n can be calculated from the calculated bottom-peak value 303a. That is, each of the optical network units 230-1 to 230-n can adjust the intensity of the generated upward optical signal 333 in consideration of the calculated distance between the optical line termination 210 and a corresponding optical network unit 230-1 or 230-n.

Figure 5C:
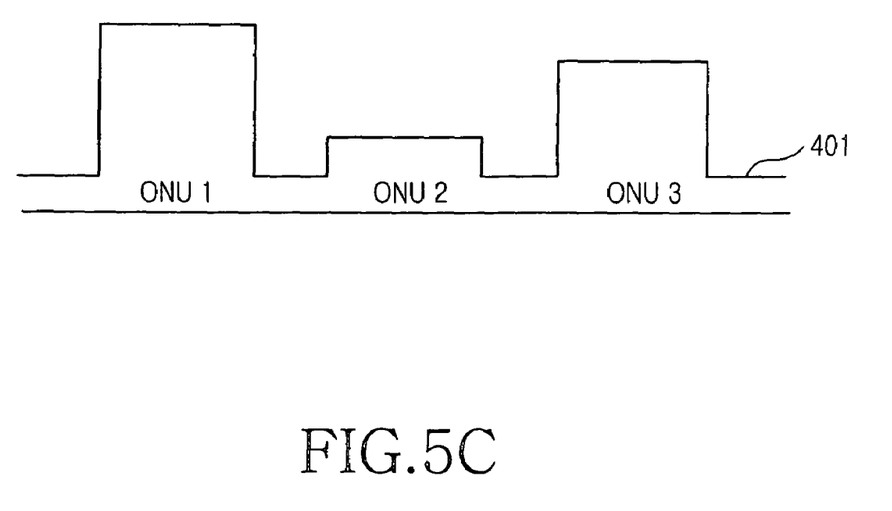

As shown in FIG. 5c, the upward optical signals 401, which have been transmitted from the optical network units 230-1 to 230-n and detected by the optical line termination 210, have intensities different from each other, dependent on a distance between the optical line termination 210 and each of the optical network units 230-1 to 230-n.

Figure 5D:
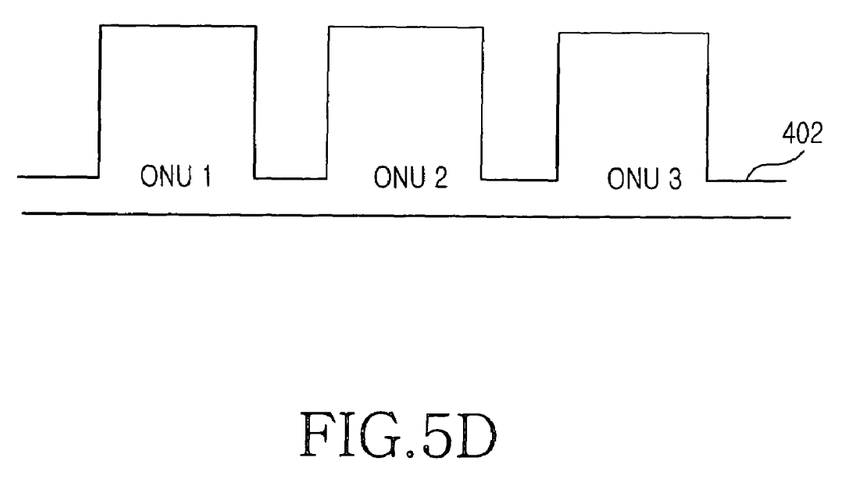

As shown in FIG. 5b, when the distance between the optical line termination 210 and a corresponding optical network unit 230-1 or 230-n is larger than a reference distance, a corresponding optical network unit 230-1 or 230-n generates the upward optical signal 333 having an intensity larger than an upward optical signal 334 having a reference intensity. As a result, the optical network units 230-1 to 230-n adjust the intensities of generated upward optical signals 402 according to distances spaced from the optical line termination 210, so that the upward optical signals inputted to the optical line termination 210 can be controlled to have a constant intensity as shown in FIG. 5d.

As described above, in the present invention, since each optical network unit calculates a distance to an optical line termination from the intensity of a downward optical signal received from the optical line termination, and adjusts the intensity of a generated upward optical signal according to the calculated distance, the optical line termination can exclude a burst-mode receiver. Accordingly, since the optical line termination does not include a burst-mode receiver, it is possible to construct a more economic passive optical network and an operation characteristic is stabilized.

While the invention has been shown and described with reference to certain preferred embodiments herein, it will be understood by those skilled in the art that various changes in form and details may be made thereon without departing from the spirit and scope of the invention as defined by the appended claims.

What is claimed is:

1. A passive optical network comprising:
an optical line termination for generating multiple downward optical signals; and
multiple optical network units for receiving said downward optical signals, wherein each optical network unit comprises:
a receiver for converting a corresponding downward optical signal inputted from the optical line termination into a first voltage signal and outputting the first voltage signal; and
a transmitter for calculating a distance to the optical line termination from an intensity of the first voltage signal outputted from the receiver and generating an upward optical signal having an intensity adjusted according to the calculated distance to the optical line termination, wherein the transmitter comprises:
a second limiting amplifier for amplifying a second voltage signal;
a laser diode for converting the second voltage signal into the upward optical signal;
a peak detector for calculating an intensity of the first voltage signal inputted from the preamplifier;
a first APC circuit for controlling an intensity of the upward optical signal generated by the laser diode according to the intensity of the first voltage signal;
a temperature compensation circuit for compensating for temperature changes of the laser diode; and
a second APC circuit for controlling the upward optical signal generated by the laser diode such that it may have a substantially constant intensity.

2. The passive optical network as in claim 1, wherein the receiver comprises:
a photodiode for converting the corresponding downward optical signal into a first current signal;
a preamplifier for converting the first current signal to a first voltage signal; and
a first limiting amplifier for amplifying the first voltage signal.

3. A transceiver employed in a passive optical network including an optical line termination and multiple optical network units, each of the multiple optical network units having the transceiver, the transceiver comprising:
a receiver for converting a corresponding downward optical signal inputted from the optical line termination into a first current signal and converting the first current signal to a first voltage signal; and
a transmitter including:
a laser diode for generating an upward optical signal outputted to the optical line termination from a second voltage signal,
a peak detector for detecting an intensity of the first voltage signal inputted from the receiver,
a first APC circuit receiving the peak detected first voltage signal and controlling an intensity of the upward optical signal according to the intensity of the first voltage signal;
a second limiting amplifier for amplifying the second voltage signal;
a laser driving circuit for outputting the second voltage signal to the laser diode and adjusting an intensity of the upward optical signal generated by the laser diode according to a control from the APC circuit;

a temperature compensation circuit for compensating for output change of the laser diode according to temperature change; and a second APC circuit for controlling the laser driving circuit according to instructions from the temperature compensation circuit.

4. The transceiver as in claim 3, wherein the receiver further comprises: a photodiode for converting a corresponding downward optical signal to a first current signal;

a preamplifier for converting the first current signal to a first voltage signal; and a first limiting amplifier for amplifying and outputting the first voltage signal.

5. A transceiver employed in a passive optical network including an optical line termination and multiple optical network units, each of the multiple optical network unit having the transceiver, the transceiver comprising:

a receiver for converting a corresponding downward optical signal inputted from the optical line termination into a first current signal and converting the first current signal to first voltage signal; and a transmitter for generating an upward optical signal, which is to be outputted to the optical line termination, from a second voltage signal, and controlling intensity of the upward optical signal according to intensity of the first voltage signal said transmitter comprising:

a transmitter limiting amplifier for amplifying and outputting the received first voltage signal;

a laser diode for converting the second voltage signal into the upward optical signal to be outputted to the optical line termination;

a first APC circuit for controlling intensity of the upward optical signal based on the first voltage signal:

a laser driving circuit for outputting the second voltage signal to the laser diode, and driving the laser diode according to instructions of the first APC circuit, wherein the laser driving circuit adjusts an intensity of the upward optical signal;

a temperature compensation circuit for compensating for a change of intensity of the upward optical signal according to temperature change; and a second APC circuit for controlling the laser driving circuit according to instructions of the temperature compensation circuit.

6. The transceiver as in claim 5, wherein the receiver further comprises:

a photodiode for converting a corresponding downward optical signal into the first current signal;

a preamplifier for converting the first current signal to the first voltage signal; and a first limiting amplifier for amplifying and outputting the first voltage signal, wherein the preamplifier outputs a first portion of the first voltage signal to the transmitter and outputs a second portion of the first voltage signal to the first limiting amplifier.

7. The transceiver as in claim 5, wherein the transceiver further comprises a media access control for converting the first voltage signal, which is inputted from the receiver, to a digital signal, outputting the digital signal, and calculating a transmission distance of a corresponding downward optical signal.

8. The transceiver as in claim 7, wherein the transmitter comprises:

a micro-controller unit for outputting the first voltage signal inputted from the media access control and generating a control signal for controlling the first APC circuit according to instructions of the media access control; and a digital-to-analog converter for converting the first voltage signal inputted from the micro-controller unit to an analog signal and outputting the analog signal to the first APC circuit together with the control signal inputted from the micro-controller unit.

* * * * *